United States Patent
Cecchi et al.

(10) Patent No.: US 6,466,626 B1
(45) Date of Patent: Oct. 15, 2002

(54) DRIVER WITH IN-SITU VARIABLE COMPENSATION FOR CABLE ATTENUATION

(75) Inventors: Delbert Raymond Cecchi; Richard L. Donze, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/256,517

(22) Filed: Feb. 23, 1999

(51) Int. Cl.$^7$ .............................. H04B 3/00; H03H 5/00
(52) U.S. Cl. .................................... 375/257; 333/24 R
(58) Field of Search ................................ 375/257, 224, 375/259, 219; 333/28 R, 24 R, 160; 324/76 R, 77, 83 R, 439, 442; 327/65, 108, 63, 68

(56) References Cited

U.S. PATENT DOCUMENTS

| | | | |
|---|---|---|---|
| 3,728,649 A | * | 4/1973 | Waldhauer ................ 333/18 |
| 4,041,239 A | | 8/1977 | Haass ...................... 178/68 |
| 4,151,490 A | | 4/1979 | Bazin ...................... 333/16 |
| 4,217,553 A | | 8/1980 | Winebarger ................ 328/164 |
| 4,495,468 A | | 1/1985 | Richards et al. ............ 328/155 |
| 4,519,083 A | | 5/1985 | Hanson ..................... 375/9 |
| 4,583,235 A | | 4/1986 | Domer et al. ................ 375/11 |
| 4,754,164 A | | 6/1988 | Flora et al. ................ 307/269 |
| 4,788,509 A | | 11/1988 | Bahl et al. .................. 330/54 |
| 4,872,184 A | | 10/1989 | Yamaguchi et al. .......... 375/14 |
| 4,879,727 A | | 11/1989 | Ramesh et al. ............... 375/76 |
| 5,043,596 A | | 8/1991 | Masuda et al. .............. 307/262 |
| 5,124,673 A | | 6/1992 | Hershberger ................ 333/18 |
| 5,134,636 A | | 7/1992 | Barucchi et al. ............ 375/106 |
| 5,175,747 A | | 12/1992 | Murakami ................... 375/14 |
| 5,278,873 A | | 1/1994 | Lowrey et al. .............. 375/118 |
| 5,293,405 A | | 3/1994 | Gersbach et al. ............ 375/14 |
| 5,313,501 A | | 5/1994 | Thacker ..................... 375/117 |
| 5,343,236 A | | 8/1994 | Koppe et al. ................ 348/6 |
| 5,347,544 A | | 9/1994 | Garcia et al. ............... 375/36 |

(List continued on next page.)

FOREIGN PATENT DOCUMENTS

| | | | |
|---|---|---|---|
| JP | 5596747 | 7/1980 | ........... H04L/25/49 |
| JP | 6247219 | 2/1987 | ............. H04B/3/04 |
| JP | 2224532 | 9/1990 | ............. H04B/3/06 |
| JP | 4362808 | 12/1992 | ........... H03H/21/00 |
| WO | 9820654 | 5/1998 | ........... H04L/25/02 |

OTHER PUBLICATIONS

IBM Technical Disclosure Bulletin, vol. 23, No. 4, Sep. 1980, pp. 1423–1428, "Multi–Port Fiber–Optic Signal Distribution System".

(List continued on next page.)

*Primary Examiner*—Jean Corrielus
*Assistant Examiner*—Khai Tran
(74) *Attorney, Agent, or Firm*—Karuna Ojanen; Robert R. Williams

(57) ABSTRACT

A digital data waveform is precompensated for attenuation through a transmission medium. First, during actual initial power-on or upon reconfiguration of a digital communication system, attenuation characteristics of the transmission medium are actually measured. The attenuation characteristics can be measured by measuring the length of the transmission medium, measuring the error rate of test packets having known frequency, measuring the slope of a test pulse at two separate threshold voltages, and/or measuring the error rate of a random signal packet. Upon determination of the magnitude of the attenuation characteristic, one of a plurality of registers corresponding to the range of values of the attenuation characteristic is selected. These registers have a plurality of pre-emphasis coefficients to be applied in the driver to each bit of a series of digital signal pulses as determined by the transition history of at least three sequential bits. Thus, dynamic and in-situ pre-emphasis can be determined and applied to signals to compensate for attenuation in the transmission network attenuation.

13 Claims, 10 Drawing Sheets

U.S. PATENT DOCUMENTS

| | | | | |
|---|---|---|---|---|
| 5,369,640 A | | 11/1994 | Watson et al. ................. | 371/1 |
| 5,373,535 A | | 12/1994 | Ellis et al. ................... | 375/106 |
| 5,384,781 A | | 1/1995 | Kawabata ..................... | 371/1 |
| 5,386,420 A | | 1/1995 | Blaum et al. .................. | 371/1 |
| 5,392,318 A | | 2/1995 | Ellis et al. .................. | 375/118 |
| 5,408,507 A | | 4/1995 | McNamara et al. ........ | 375/371 |
| 5,418,817 A | | 5/1995 | Richter ........................ | 375/232 |
| 5,422,950 A | | 6/1995 | Miller et al. ................. | 379/399 |
| 5,434,883 A | | 7/1995 | Kimoto et al. .............. | 375/231 |
| 5,455,831 A | | 10/1995 | Bartow et al. ................ | 371/1 |
| 5,455,843 A | | 10/1995 | Cherubini et al. .......... | 375/230 |
| 5,579,336 A | | 11/1996 | Fitzgerald et al. .......... | 375/219 |
| 5,579,352 A | | 11/1996 | Llewellyn ................... | 375/376 |
| 5,592,510 A | | 1/1997 | Van Brunt et al. .......... | 375/220 |
| 5,621,774 A | | 4/1997 | Ishibashi et al. ............ | 375/371 |
| 5,649,010 A | | 7/1997 | Gysel et al. ................ | 379/406 |
| 5,670,916 A | * | 9/1997 | Korn .......................... | 333/18 |
| 5,684,839 A | * | 11/1997 | Smith et al. ................ | 375/348 |
| 5,717,729 A | | 2/1998 | Iknaian et al. .............. | 375/356 |
| 5,727,021 A | | 3/1998 | Truebenbach ............... | 375/226 |
| 5,745,533 A | | 4/1998 | Asada et al. ................ | 375/354 |
| 5,768,283 A | | 6/1998 | Chaney ........................ | 371/1 |
| 5,770,950 A | | 6/1998 | Zurcher et al. ............... | 326/30 |
| 5,771,237 A | | 6/1998 | Kao ............................ | 370/463 |
| 5,771,262 A | | 6/1998 | Benayoun et al. .......... | 375/257 |
| 5,822,330 A | | 10/1998 | Buckland ...................... | 371/1 |
| 5,857,001 A | | 1/1999 | Preuss et al. ............... | 375/257 |
| 6,212,229 B1 | * | 4/2001 | Salinger ..................... | 375/224 |

OTHER PUBLICATIONS

IBM Technical Disclosure Bulletin, vol. 29, No. 9, Feb. 1987, pp. 3780–3783, "Digital Multiplexed Video and Synchronization for Pulse–Stretched Signals".

IBM Technical Disclosure Bulletin, vol. 30, No. 2, Jul. 1987, pp. 568–572, "Scheme for Reducing Clock Skew in Multiple–Chip System Design".

Proakis, John G., *Digital Communications* (2d ed.), McGraw–Hill, 1989, pp. 64–67.

IBM Technical Disclosure Bulletin, vol. 33, No. 6B, Nov. 1990, pp. 94–96., "Control Circuitry for Synchronizing Digital Signals".

Haykin, Simon, *Communication Systems*, John Wiley & Sons, 1994, pp. 412–413, 424–427, 461–464.

Dally, William J. et al, "Transmitter Equalization for 4–GBPS Signaling, " IEEE Micro, Jan.–Feb. 1997, pp. 48–56.

Taratorin, Alex, *Characterization of Magnetic Recording Systems: A Practical Approach*, Gruzik Technical Enterprises, 1997, Chapter 9 found at http://www.guzik.com/Chapter9.html.

Dally, William et al., "Multi–gigabit signaling with CMOS", Hot Interconnects 6, Stanford University, Palo Alto, California, Aug. 1998.

* cited by examiner

DRIVER WITH IN-SITU VARIABLE COMPENSATION FOR CABLE ATTENUATION

BACKGROUND OF THE INVENTION

1. Technical Field

The present invention relates in general to data transmission and in particular to extending the distance over which data may be transmitted on a transmission line which inherently distorts the transmission. Still more particularly, the present invention relates to in-situ dynamic selection of pre-emphasis, also called equalization, coefficients to apply to a signal to pre-compensate the waveform for attenuation through a transmission cable.

2. Description of the Related Art

Digital data are typically transmitted over various metallic transmission media, including coaxial cables, in the form of a series of square waves or pulses. Transmission of digital data therefore requires the use of a low-pass channel or cable with a bandwidth large enough to accommodate the essential frequency content of the data stream. High speed digital signals transmitted over cables or other transmission media may be severely distorted because the cable is not ideal and is dispersive in that each received pulse is affected by adjacent pulses, causing a phenomena called intersymbol interference. Intersymbol interference is a major source of bit errors in the reconstructed data stream at the receiver. To correct for intersymbol interference the pulse shape of the signal can be controlled in the overall system. There is a limit, however, to the data transmission rate and/or the distance over which signals may be transmitted because of intersymbol interference.

The data transmission rate for an information bearing signal on a transmission mission line is limited by data jitter, or the tendency of transitions to occur at different points during the respective signal periods. Data jitter arises as a result of two phenomenon: transmission line attenuation typically increases with frequency; and data transitions in adjacent signal periods appear to the transmission line as a signal with a different set of frequencies than transitions which are separated by several signal periods; this is the phenomena that causes intersymbol interference. For example, transmission of the pattern 10101010 will be attenuated differently than transmission of 10011001. The higher attenuation causes signals with irregular transitions to be more severely distorted, with transitions occurring at different points during the signal period than in signals with regular transitions. This limits the pulse width, and thus the data rate, at which data may be accurately transmitted and received.

The distance over which an information bearing signal may be transmitted on a transmission line is primarily limited by the phase distortion introduced by the transmission line. Progressive alteration of the pulse shape from the predetermined pulse shape for which a receiver is designed to operate may lead to transmission errors and limit the maximum range of the transmission.

Several prior art approaches attempt to alleviate the problems arising from distortion. One approach, known as receiver equalization, involves processing the received signal to make it more nearly correspond to the predetermined pulse shape. However, receiver equalization is often complicated by overlap in adjacent pulses in high speed transmission systems.

A second prior art approach, referred to as predistortion or transmitter equalization, employs a separate mechanism at the output of the transmitter to alter the shape of the pulse introduced onto the transmission line. The predistortion is intended to be the inverse of the distortion resulting from inherent cable losses. This technique is suitable when the length and material of the transmission line is known so that the distortion can be estimated and a fixed predistortion factor can be preprogrammed. Another predistortion technique applies voltage to the output signal based on whether the previous bit is identical or different than a bit. Because cable distortion affects all bits in the data stream and is not limited to specific bits, this technique is limited in how closely the predistortion can be made to match the inverse of the cable distortion.

Transmitter or receiver equalizers are the most commonly used technique for dealing with cable attenuation. Passive external components are used to form a filter circuit which has a response approximating the inverse of the cable response, with the "gain" of the filter set to equal the loss of the cable.

Another prior art approach to countering transmission line distortion, which may be used in conjunction with receiver or transmitter equalization, involves special encoding of the data to be transmitted. However, predistortion techniques for such signals may be unsuitable for transmitting unencoded or non-return-to-zero (NRZ) data.

It is therefore an object of the present invention to provide improved data transmission and to provide a method of dynamically compensating signals prior to transmission of the signals over a transmission line.

SUMMARY OF THE INVENTION

The foregoing object is achieved by a method and apparatus which dynamically selects appropriate pre-emphasis coefficients based on an in-situ determination of the network attenuation characteristics and then to apply a pre-emphasis coefficient to each data bit of the data transmission as the bits are transmitted based on the history of the data transitions. From a group of several pre-emphasis coefficients, one is selected from one of several described techniques, e.g., measuring the length of the cable, measuring the error rate of returned/received signals, and/or measuring the slope of the returned/received signals at two different voltages.

In one embodiment of the invention, a method of digital signal transmission in a conductive network is disclosed, the method comprising the steps of transmitting a series of digital signal pulses from a driver through a transmission medium to a receiver in said conductive network, determining at least one of a plurality of attenuation characteristics of the conductive network between the driver and the receiver, dynamically providing a pre-emphasis coefficient to each bit of the digital signal pulses as it is being transmitted, wherein the pre-emphasis coefficient is selected on the basis of one of the determined attenuation characteristic.

One attenuation characteristic that can be determined is the length of the transmission medium, usually a coaxial cable, connecting the driver and the receiver across which the series of digital signal pulses are transmitted. Then based on the length, one of a group of pre-emphasis coefficient registers is selected within which a plurality of pre-emphasis coefficients are stored. Then one of a plurality of pre-emphasis coefficients stored within the selected register is selected as determined by a history of at least three of said digital signal pulses. Other attenuation characteristics that can be measured to determine an appropriate pre-emphasis coefficient are the transition frequency of the digital signal pulses, the gauge of the cable, temperature of said network, or humidity of said network.

The method may further be described as transmitting a random signal packet of the digital signal pulses through the transmission medium connecting the driver and the receiver; receiving the transmitted random signal packet either reflected back from or retransmitted from the receiver; incrementing and selecting one of a plurality of pre-emphasis coefficient registers and applying one of a plurality of pre-emphasis coefficients in the selected pre-emphasis coefficient registers to the random signal packet until there are no errors in the received random signal packet. Dynamically providing a pre-emphasis coefficient to each bit of the random signal packet can be accomplished by selecting a pre-emphasis coefficient based on the history of at least three of the bits in the random signal packet.

The invention may also be embodied as a method in which the step of dynamically providing a pre-emphasis coefficient further comprises: transmitting a first test packet of known frequency through said transmission medium connecting the driver and the receiver; receiving the transmitted first test packet either reflected back from or retransmitted from the receiver; determining if the received first test packet has no errors; setting a plurality of pre-emphasis coefficients in a pre-emphasis coefficient register to zero; transmitting a n test packet of n frequency higher than the known frequency through the transmission cable; receiving the transmitted n test packet either reflected back from or retransmitted from the receiver. If the received n test packet has errors, the pre-emphasis coefficient register is incremented and the n test packet is transmitted again and the pre-emphasis coefficient register is incremented again until the received n test packet has no errors. Then a n+1 test packet of a n+1 frequency higher than said n frequency is transmitted through the transmission cable and the n+1 test packet is either reflected back or retransmitted from the receiver. If the received n+1 test packet has errors, the pre-emphasis coefficient register is incremented and the n+1 test packet is transmitted again and the pre-emphasis coefficient register is incremented again until the received n+1 test packet has no errors. When both the n+1 and n returned test packets have no errors, the last incremented pre-emphasis coefficient register is selected. And again, a pre-emphasis coefficient is applied in the driver to each bit of the digital signal pulses as determined by a history of at least three of said bits of said signal packet.

The step of determining at least one of a plurality of attenuation characteristics may further comprise transmitting a test pulse through the cable, providing an first input threshold voltage to the receiver, retransmitting the test pulse through the cable, and providing a second input threshold voltage to the receiver. By measuring the slope of the rise/fall edge of the test pulse between the first and second input threshold voltages, one of a plurality of pre-emphasis coefficient registers having a plurality of the pre-emphasis coefficients to provided to series of digital signal pulses can be dynamically selected. A pre-emphasis coefficient is applied in-situ in the driver to each bit of the series of digital signal pulses as determined by a history of at least three bits of the signal packet.

The invention may also be embodied in an apparatus for digital signal transmission in a conductive network, comprising means for transmitting a series of digital signal pulses from a driver to a receiver; means for measuring one of a plurality of attenuation characteristics of the transmitting means; means for selecting one of a plurality of pre-emphasis coefficient registers, each register corresponding to a range of measurement values of one of the attenuation characteristics; means to select one of pre-emphasis coefficients stored in the selected pre-emphasis coefficient registers based on the history of at least three bits of the series of digital signal pulses; and means to dynamically apply the selected pre-emphasis coefficient to each bit of the series of digital signal pulses.

The invention may also be described as an apparatus for digital signal transmission in a conductive network, comprising a driver from which to drive a series of digital signal pulses; a receiver to receive the series of digital signal pulses; a transmission medium connecting the driver and the receiver; a shift register to store at least three sequential bits of the series of digital signal pulses; a plurality of pre-emphasis coefficient registers connected to the shift register and to the driver, each of the registers having a plurality of pre-emphasis coefficients, one pre-emphasis coefficient to be applied to a particular bit of the digital signal pulses as determined by a history of at least three sequential bits stored in the shift register as the digital signal pulses are transmitted onto the transmission medium from the driver; a selector connected to the receiver and the pre-emphasis registers, the selector being enabled to select one of the pre-emphasis coefficient registers as determined by attenuation characteristics of said transmission medium.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2c is a typical "eye diagram" of digital signal transmission.

DETAILED DESCRIPTION OF THE PREFERRED EMBODIMENT

Figure 1:
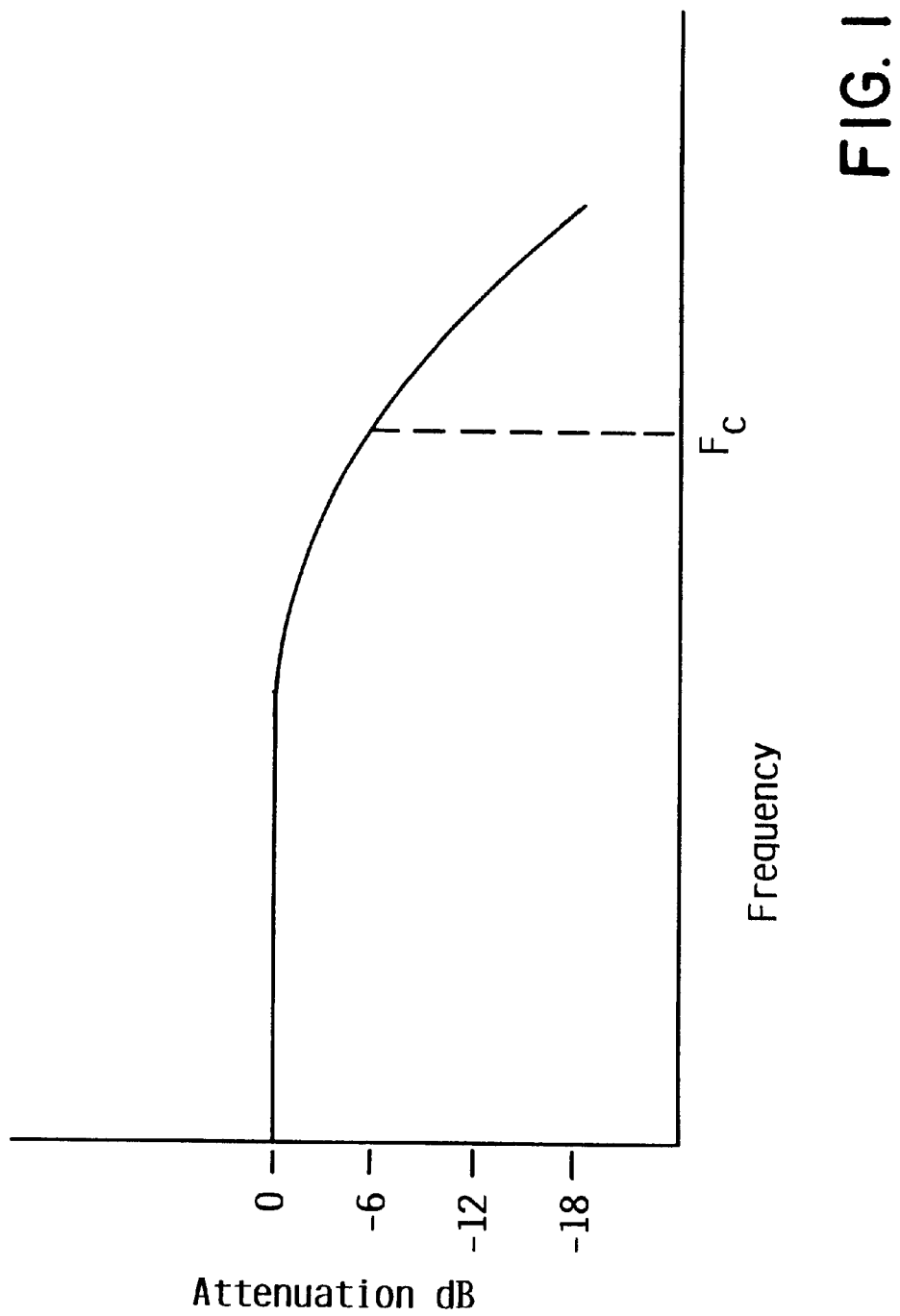
FIG. 1 depicts a frequency-response curve.

With reference now to the figures, and in particular with reference to FIG. 1, a plot of the attenuation of a waveform as a function of frequency is shown. Frequency herein is defined to be the frequency of transitions of digital signals on a metallic media, as when the signal transitions from a 1 to a 0 or from a 0 to a 1. The present invention is thus applicable to either single-ended signals, in which data is represented by a voltage level or a transition between voltage levels, or balanced (differential) digital signals, in which data is represented by a voltage difference polarity between two signals of a transition in voltage difference polarity. When the signal is stable, that is, at a low frequency, there is little or no attenuation, but as the frequency of the transitions increases, the attenuation gradually increases until a cut-off frequency, $F_c$ is reached at which point the attenuation is so severe that the signal is degraded and reliability of the data is lost.

Figure 2A:
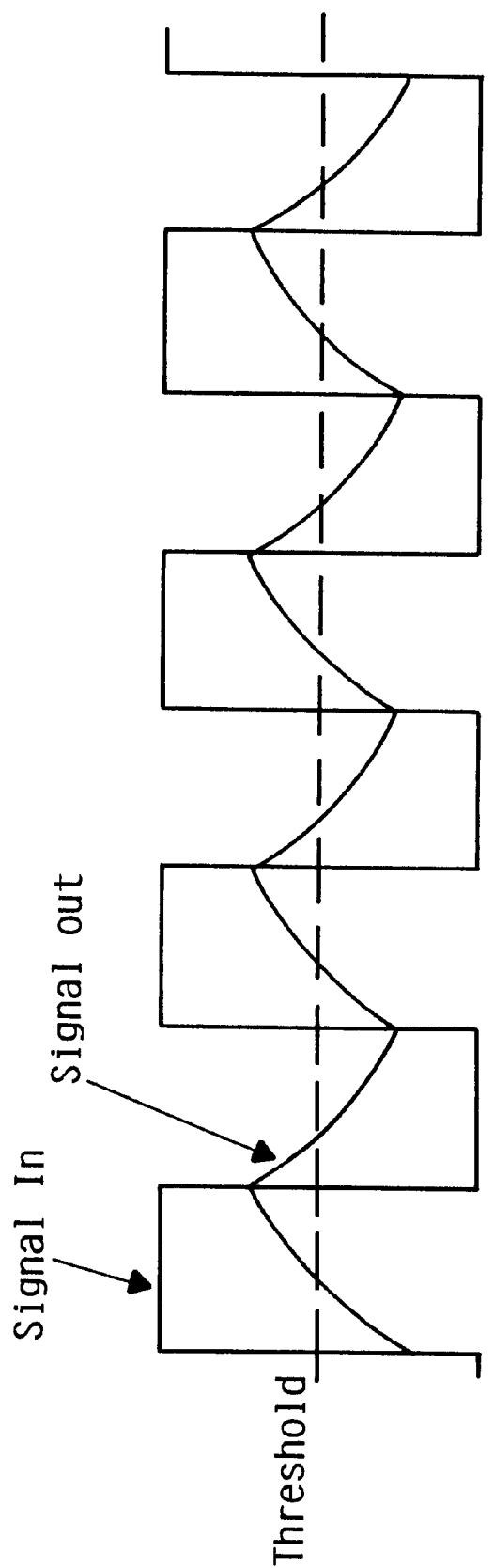
FIGS. 2a, 2b, and 2c illustrate the effect of cable attenuation on two signals of different patterns.
Figure 2B:
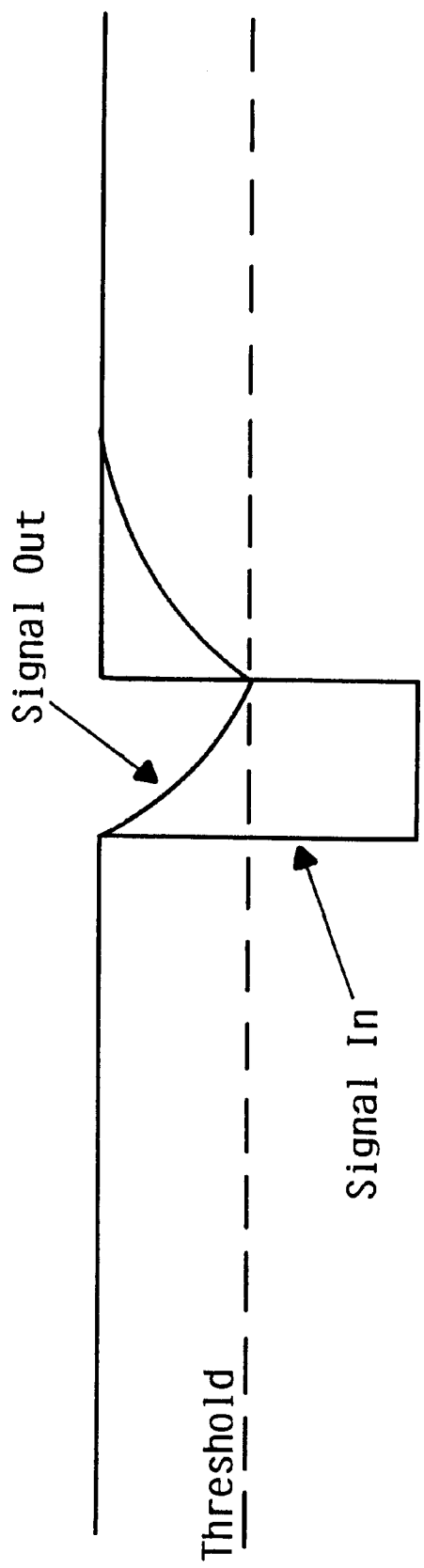

FIGS. 2a and 2b provide examples of how cable attenuation affects the reliability of signal at transitions. FIG. 2a illustrates an input clock signal or data signal of 10101010 on a transmission line. The threshold voltage represents the voltage at which the signal will be detected. Note that with a regular frequency, the rise and fall times of the 1 and the 0 signal remain near the threshold voltage in the center, so the signal crosses the threshold voltage level and is detected with no error. Precompensation is not necessary became the signal pattern has one frequency.

FIG. 2b, however, shows a signal transmission of an isolated bit. The input signal is 111101111. In this figure, the output signal has risen to full voltage level because of the lack of transitions. When an isolated transition occurs, however, the cable attenuation may be so severe that the voltage level never reaches the threshold voltage and the transition is never detected thus causing an error in this data stream.

Figure 2C:
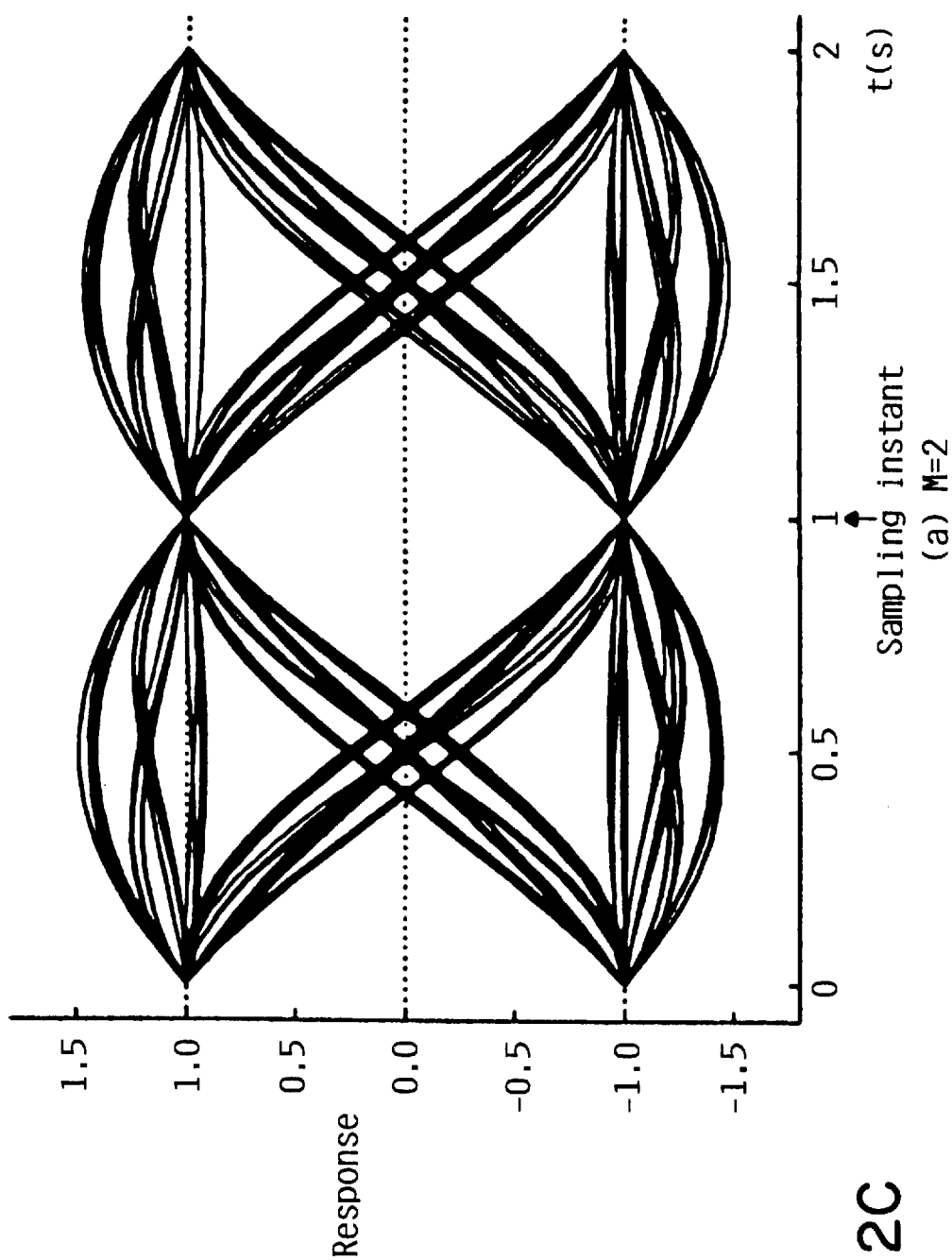

FIG. 2c is an eye diagram which represents the transmission of a random data pattern having values of −1, 1 through a medium. It is noted that the signals converge at the clock frequency T at two values: an upper value at 1 and a lower level at −1. For threshold detection, it is desirable to keep these eyes open because the width of the eye opening defines the time interval over which the received signal can be sampled without error from intersymbol interference, and the height of the eye opening defines the noise margin of the system. When the effect of intersymbol interference is severe, traces from the upper portion of the eye pattern cross traces from the lower portion, with the result that the eye is completely closed. In such a situation it is impossible to avoid errors in the data transmission because of the combined effect of noise and intersymbol interference.

It is known that attenuation is not only a function of the frequency of the transmitted signal, but also a function of the cable characteristics, e.g., length, gauge of the cable, insulating material surrounding the cable, conducting medium, etc. Although the communication and information handling industries have attempted to standardize cables, many factors, including environmental factors, remain which can affect cable attenuation. Network configurations, cables, connectors, etc. have become interchangeable. Thus, even when cable attenuation is specified in a product, it is still useful to confirm the specified attenuation or to determine actual attenuation. At a given frequency and controlled environment, however, the most significant factors affecting attenuation are the gauge of the wire, which is usually specified, and the length of the cable, which usually has to be measured.

Figure 3:
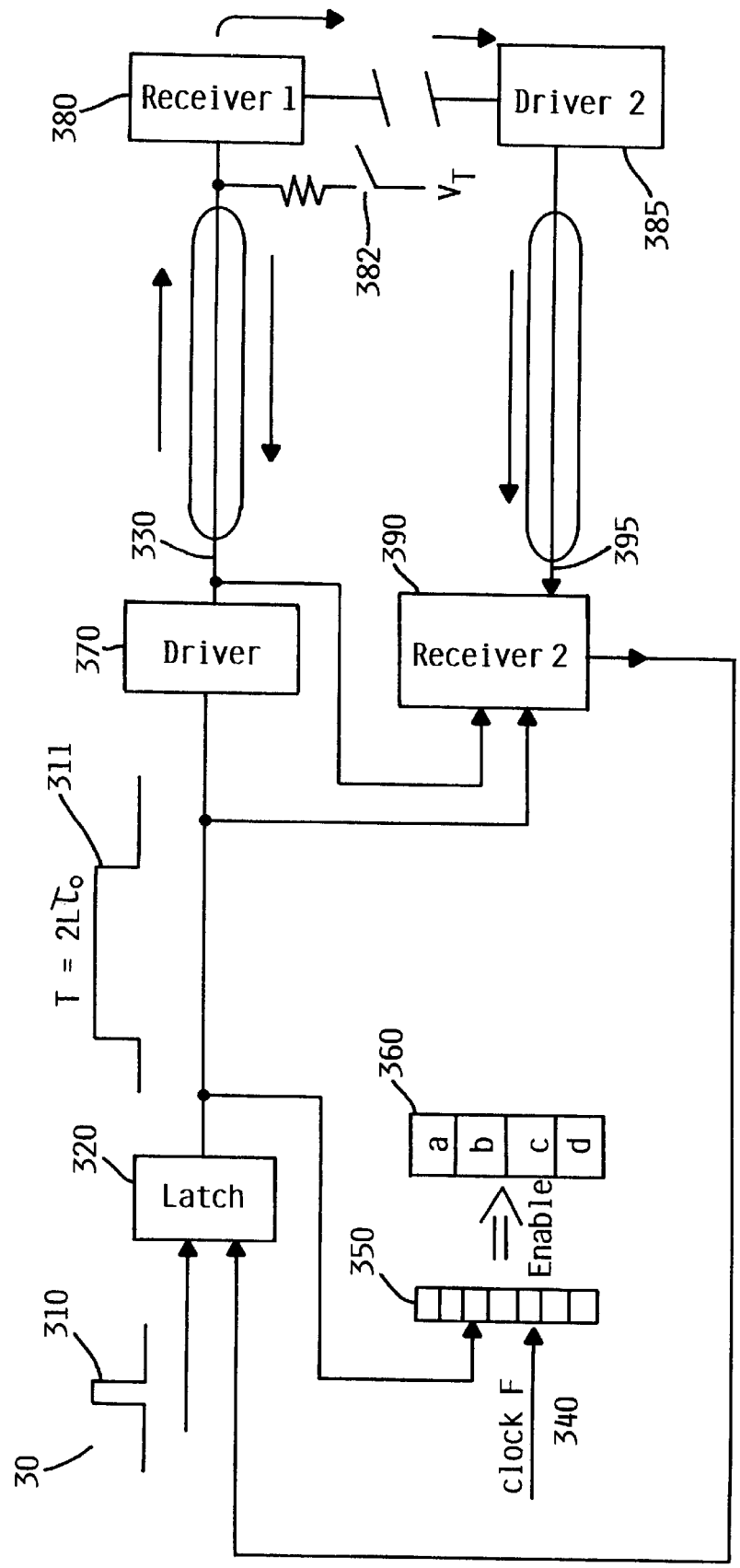
FIG. 3 is a simplified block diagram of a technique to measure the length of the cable and based on the length, to select pre-emphasis coefficients in accordance with one embodiment of the invention.

FIG. 3 is a method by which the length of a transmission medium, preferably a coaxial cable, can be measured and then based upon that measurement, one of a group of pre-emphasis or equalization coefficients can be selected. A signal pulse 310 triggers latch 320 which in turns starts counter 350 and generates an output square wave pulse 311. Also input to the counter 350 is the pulse clock 340 of known frequency F. The output pulse 311 also sends a rising edge to the receiver 390 to expect a specified voltage associated with a return signal. Output pulse 311 passes through driver 370 and down the length of the cable 330 to be measured. At the far end of the cable 330, the terminator 382 has been disconnected from the circuit so the cable 330 behaves as an open circuit and the leading edge of the output pulse 311 reflects from receiver 380 like a sound wave reflects from a canyon wall. When the signal pulse 310 returns, receiver 390 detects the returned voltage and sends a signal to latch 320 which in turn latches counter 350. By counting the number of clock pulses 340 in the counter 350, the length of the cable is simply the count in counter 350 times the clock frequency 340 divided by twice the signal velocity. Then, based on the length of the cable 330 one of a series of pre-emphasis coefficient registers 360 can be selected.

Although only four pre-emphasis coefficient registers 360 are shown, it is to be understood that four is an arbitrary number and any number can be selected depending upon the precision with which the signal is to be driven. Preferably pre-emphasis coefficient registers are integrated with driver 370. By way of example, register a of pre-emphasis coefficients may correspond to a short cable length, register b may correspond to a medium cable length, register c may correspond to a long cable length, etc. Given a fixed cable length, moreover, pre-emphasis coefficients could also compensate for other factors causing attenuation, e.g., transition frequency, wire gauge, etc.

FIG. 3 shows the reflected output pulse 311 returning on the same cable. There are two other techniques which can also be used to determine the length of the cable and the attenuation characteristics of the transmission medium. First, upon receipt of a pulse from driver 370, receiver 380 would latch the counter and the counter 350 would count the pulses for a one-way trip. Then, the counter value or even the pre-emphasis coefficients could be communicated back to the driver 370. This technique is particularly useful if the attenuation is too great for a return path of the signal, if there are multiple channels, or if the distance between the driver 370 and the receiver 380 is a small distance.

Yet another technique would be for the signal to be transmitted from driver 370 to receiver 380 and then driven from a second driver 385 to be transmitted on a different cable 395 to the second receiver 390. By measuring the time through the cables 330 and 395, through the connectors (not shown), drivers 370, 385, and receivers 380, 390, the attenuation of two cables could be determined with pre-emphasis coefficients applied at either or both drivers 370 and 385. For instance, if cable 330 had different attenuation characteristics than cable 395, one set of pre-emphasis coefficients could be applied at driver 370 and a different set of pre-emphasis coefficients could be applied at driver 385.

Figure 4:
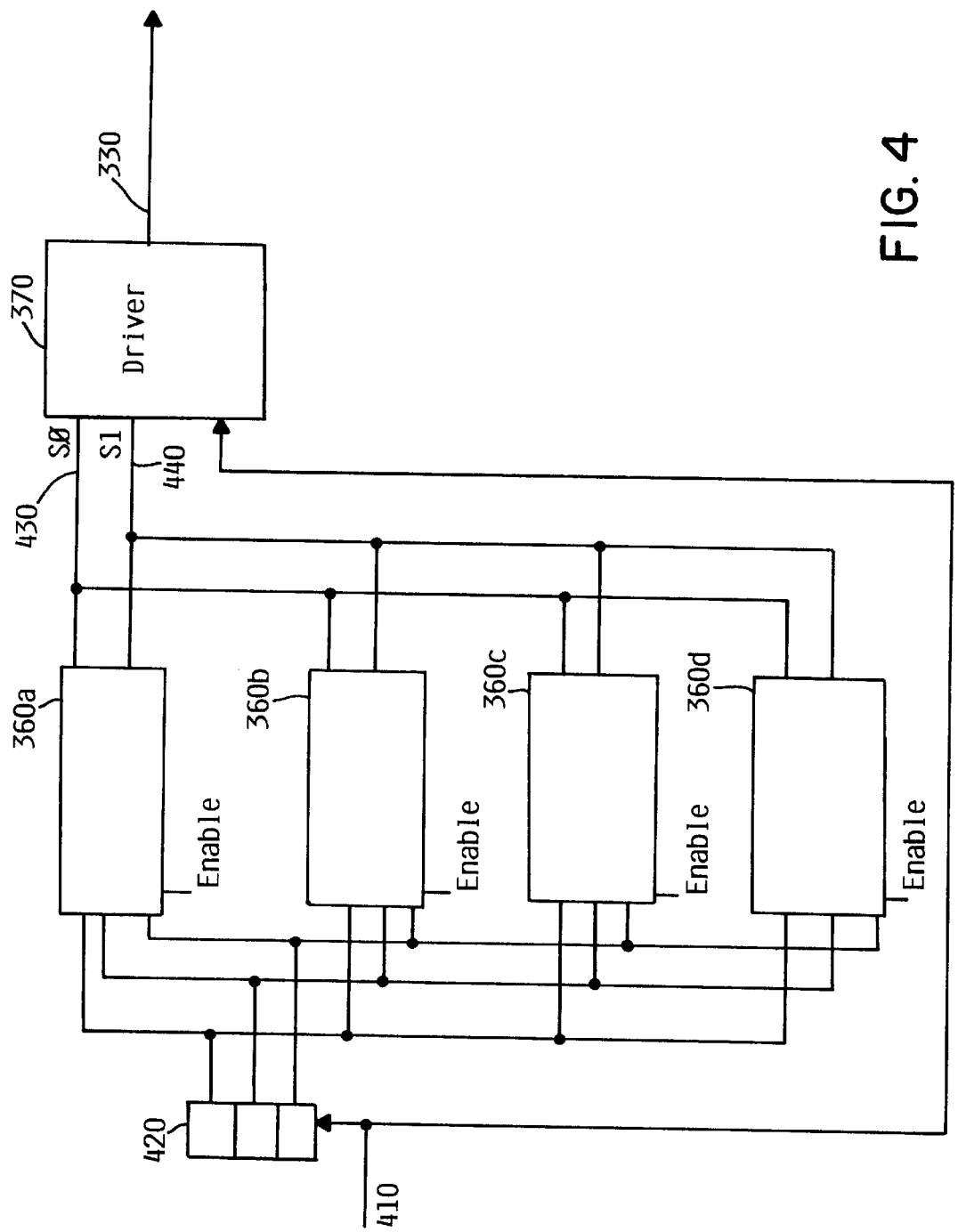
FIG. 4 is a simplified block diagram illustrating how pre-emphasis coefficients stored in registers are applied to a driver input in accordance with an embodiment of the invention.

FIG. 4 depicts how a signal is actually driven by the pre-emphasis coefficients in one embodiment of the invention. Digital data coming in on line 410 enters a shift register 420 which remembers or stores the history of the transitions of the data by storing a sequence of at least three bits. One bit, including the current or active bit, is entered into each element. Again, three is the minimum number of elements required to monitor a transition history but, of course, if desired, shift register 420 may have more than three elements in order to have greater accuracy and complexity. Pre-emphasis coefficients are stored in registers 360a, 360b, 360c, 360d. Recall that each of the four pre-emphasis coefficient registers 360a–d pertains to a designated attenuation characteristic, e.g., cable length. Again, given a fixed cable length, one can imagine that the pre-emphasis coefficients could vary with respect to other cable characteristics, such as conducting material, diameter, etc. In this example, each of the pre-emphasis coefficient registers 360a–d may be an eight by two RAM; eight because there can be eight different permutations of transitions given three bits; two because it was chosen to have two pre-emphasis coefficients per signal. Pre-emphasis coefficient registers 360a–d are shown as enabled by a separate bit line; the choice of the pre-emphasis coefficient register 360a–d can easily be done with AND/OR logic gates or with multiplexing or any of known means to select one of several registers. Once a particular pre-emphasis coefficient register 360a–d is enabled, the pre-emphasis coefficients associated with a particular transition would be applied to the each bit in driver 370. Driver 370 may be, for example, a driver circuit capable of driving multiple discrete signal strengths.

To precompensate for attenuation, the signals are over driven, i.e., an additional voltage is applied to the signal for a period of time, through driver according to the pre-emphasis coefficients. If the bit So 430 is enabled, pre-emphasis coefficient $S_o$ 430, by way of example, could overdrive a pulse or bit with higher voltage/shorter time constant at the start of a transition resulting in a shorter transistor time at the input of the receiver. Pre-emphasis coefficient $S_1$. 440, if enabled, might have a lower voltage/more gradual time constant to maintain the appropriate voltage level of the signal during transmission through cable 330. Thus, from FIG. 3, a specific pre-emphasis coefficient register 360a–d is chosen, and then in FIG. 4, the coefficients are applied to each bit as it is transmitted through the driver 370 onto cable 330 based on the transition pattern in shift register 420. For example, given the bit sequence 110, the output of the driver 370 might be:

$$V_0 S_0 T_0 + V_1 S_1 T_1 + k$$

where e.g., $V_0$=0.5 volts, $V_1$=0.25 volts, $S_0$ and $S_1$ have value of 1 or 0 to enable their respective factor of the pre-emphasis coefficient, and k is a constant representing the unattenuated signal voltage. It will be appreciated that several shift registers, associated logic, and different pre-emphasis coefficient registers can be placed within a network wherever there is a driver and a cable over which to send digital signals. The techniques thus describe techniques to measure attenuation characteristics of a cable by measuring the time it takes for signals to be transmitted to a receiver and/or reflected from an open circuit at the receiver or retransmitted from a driver at the receiver.

Figure 5A:
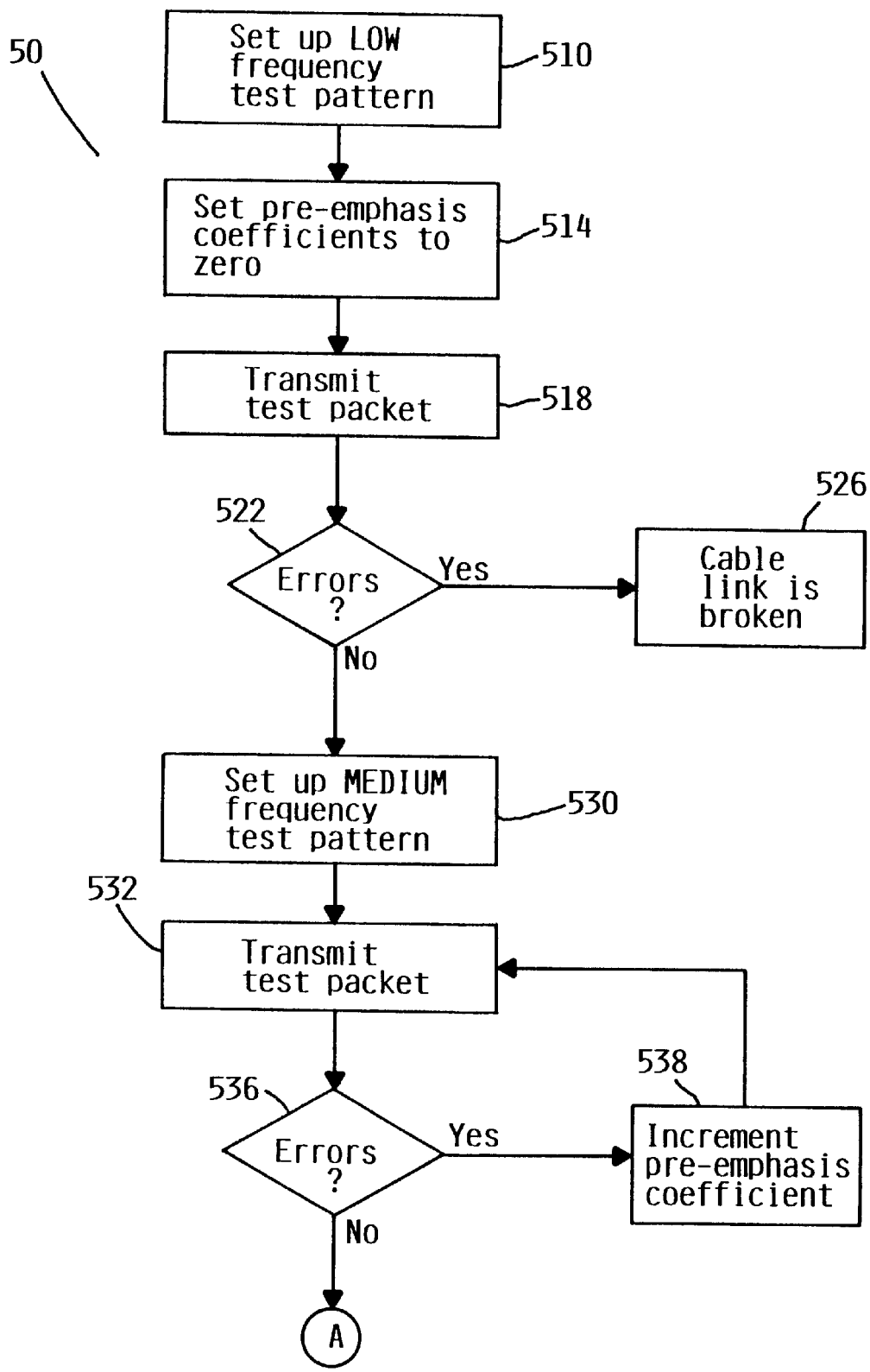
FIG. 5 is a high level flow chart of a method to select a set of pre-emphasis coefficients based on the error rate used in accordance with principles of the invention.
Figure 5B:
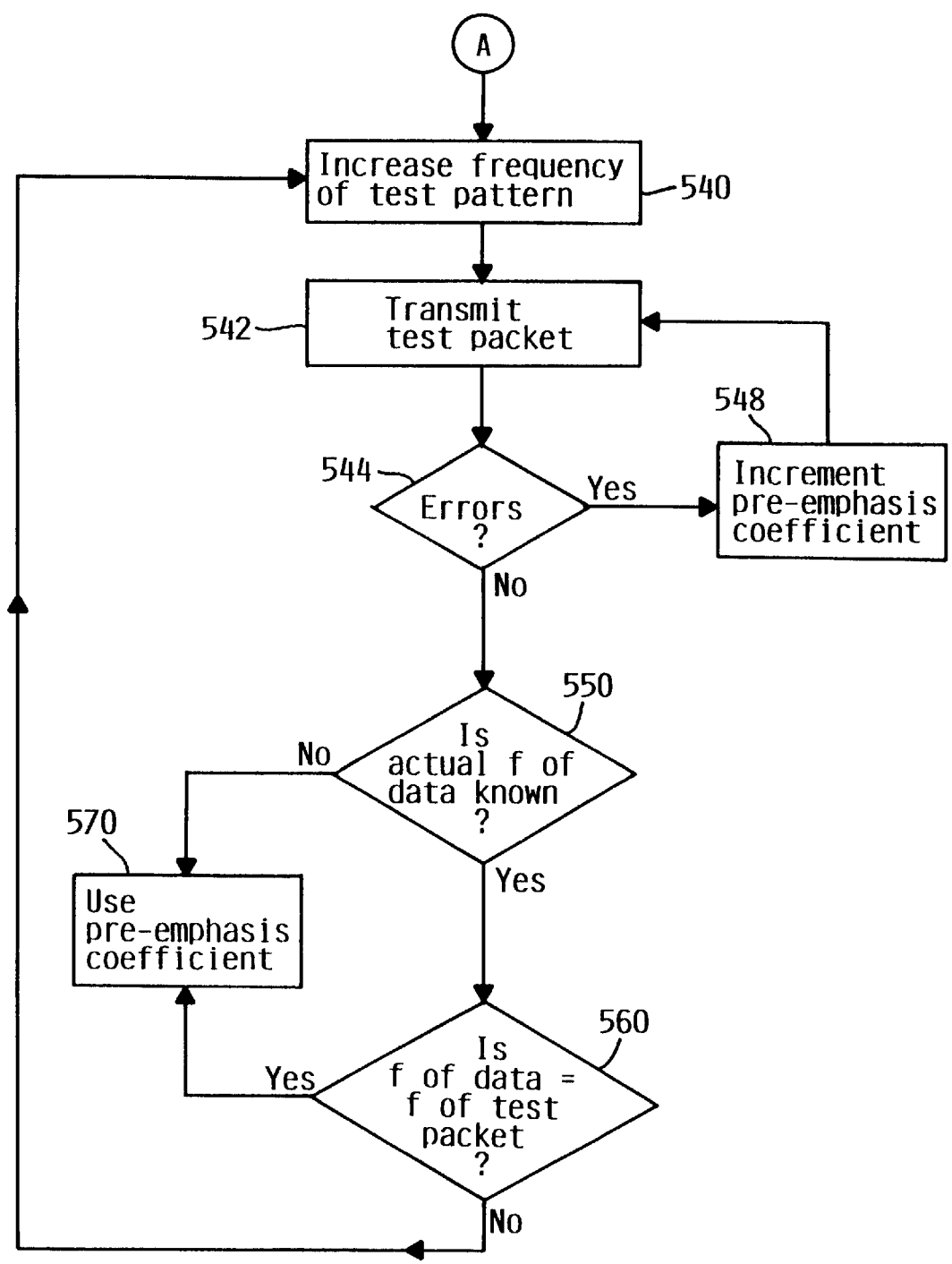

FIG. 5 illustrates another method 50 of determining appropriate pre-emphasis coefficients to apply in-situ to a data stream based on data errors of the signal transmitted through the cable as a function of frequency. Block 510 starts the method by setting up a low frequency test packet. This test packet has a very low number of transitions that is substantially guaranteed to be received with no errors when the data packet is transmitted through the cable, In step 514, all pre-emphasis coefficients are set to zero. In step 518, the test packet that should return with no errors is transmitted through the cable. Upon return or receipt, if errors are detected, as in step 526, then the cable link is broken and remedial measures must be taken. If, however, in step 522, no errors are detected in the returned test packet of low frequency, the frequency is increased as in step 530. Again, this is a test packet having a known frequency. The test packet of medium frequency is transmitted through the cable at step 532 and if any errors are detected in step 536, the pre-emphasis coefficients are increased at step 538. The same test packet is then retransmitted as in step 532 until there are no errors in the received or returned data at step 536. If the received/returned data stream has no errors at step 536, a test pattern having a higher frequency is set up and transmitted through the cable in step 542. Upon return/receipt at a receiver, if there are errors, the pre-emphasis coefficients are increased in step 548 and the test packet is retransmitted in step 542 until there are no errors detected in step 544 in the returned/received test packet. If there are no errors, then an optional query can be made at step 550 to determine if the frequency of the actual data to be transmitted is known. If the data frequency is known and that frequency is the frequency of the test packet, as in optional step 560, then the pre-emphasis coefficients determined in step 548 can be used. If however, the frequency of the test packet is less than the frequency of the actual data, then a different test pattern with higher frequency will be set up and the loop of steps 540, 542, 544, 548 or 550, 560, 570 will repeat. Typically, however, the frequency is limited based on intrinsic parameters of the system and there may not be a need to check the frequency of the test packets with the expected data frequency. Usually, moreover, the frequency of the actual data will not be known; and there may be only a limited number of times in which to increase the frequency of the test packet because the possible pre-emphasis coefficients will be predetermined.

Although the above method uses test packets with a known frequency, random test packets can also be used by simply adjusting the coefficients until the return packet is error free. Thus, the appropriate pre-emphasis coefficients by which to overdrive a digital data stream over a cable can be determined by measuring the error rate of the received/returned test packets.

Figure 6A:
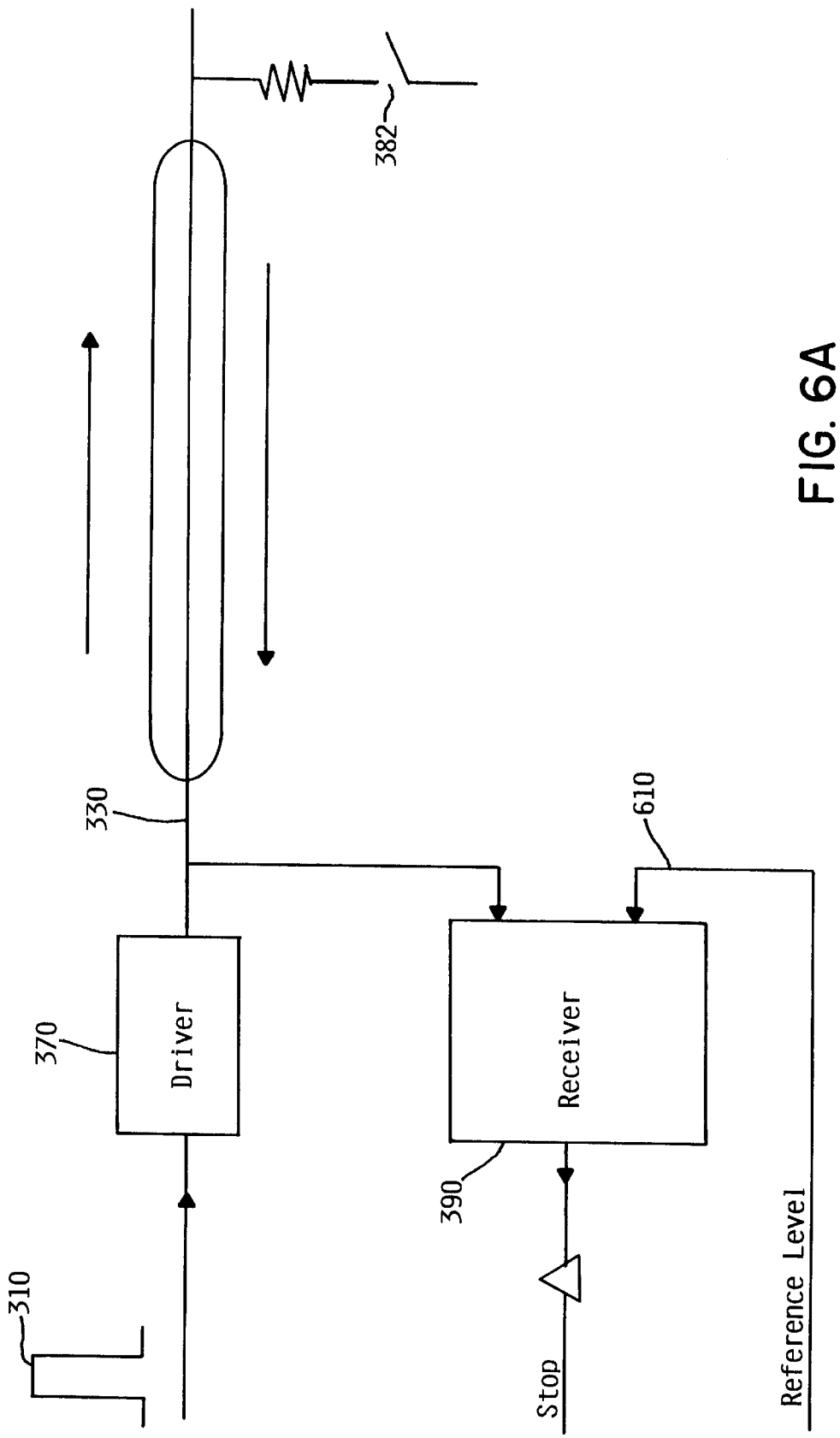
FIG. 6a is a simplified block diagram illustrating a method to measure the slope of the attenuation of a returned signal in accordance with an embodiment of the present invention.
Figure 6B:
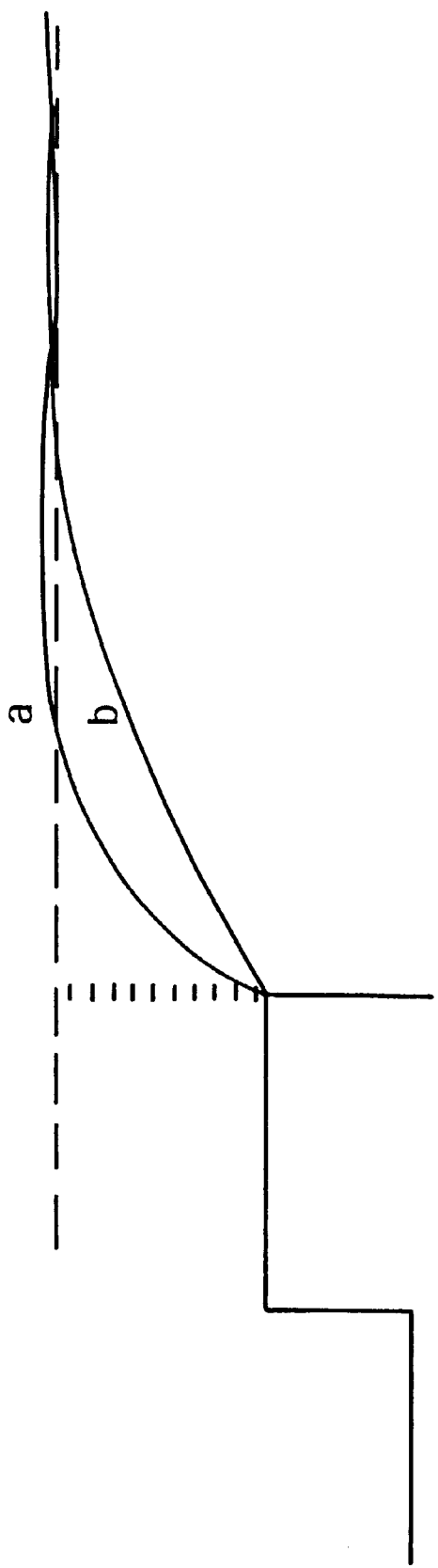
FIG. 6b illustrates the effect of attenuation on the slope of a voltage rise/fall curve.

FIGS. 6a and 6b depict another technique to determine the pre-emphasis coefficients in accordance with an embodiment of the invention. With reference to FIG. 6a, a transition 310 is transmitted from driver 370 through cable 330 and the rise time or edge speed of the transition will be degraded because of cable attenuation. For purposes of explaining the technique, it is assumed that the test signal is reflected from open 382 and reflected on the same cable 330 back to receiver 390. It will be appreciated by a skilled artisan, however, that the transmitted test packet 310 may also be received at a receiver on the far end of the cable and analyzed at that end, or the signal 310 may be retransmitted on a different cable extended from a second driver to receiver 390, as was explained with respect to FIG. 4. As shown in FIG. 6b, lines a and b represent two returned signals having different attenuation. By measuring the slope of lines a and b the attenuation of the cable can be determined and an appropriate pre-emphasis coefficient chosen. A varying input reference voltage 610 at which the receiver switches is applied to receiver 390. By subtracting the varying reference voltage level to get the time difference for a known voltage difference, the slope is determined and based on the slope, a set of pre-emphasis coefficients can be chosen or calculated.

Thus, three methods to determine appropriate pre-emphasis coefficients have been disclosed as embodiments of the invention. First, a technique to measure the length of a cable is disclosed. Then, by knowing the bulk characteristics of that cable, a set of pre-emphasis coefficients can be determined. Second, test packets can be transmitted over the cable and upon receipt/return, the error rate can be used to choose appropriate pre-emphasis coefficients. Third, the slope of line representing the gradual increase of voltage of the returned/received packet can be used to determine appropriate pre-emphasis coefficients. The determination of the actual attenuation and the selection of appropriate pre-emphasis coefficients may be accomplished during initial power on procedures or after power on, during actual data transfer, or any time a new cable/connector link has been established or reconfigured. The pre-emphasis coefficients are applied in-situ on a bit-by-bit basis depending upon the history of the transitions of the bit stream.

While the invention has been particularly shown and described with reference to a preferred embodiment, it will be understood by those skilled in the art that various changes in form and detail may be made therein without departing from the spirit and scope of the invention.

What is claimed is:

1. A method of digital signal transmission in a conductive network, comprising:

transmitting a series of digital signal pulses from a driver to a receiver in a transmission medium between said driver and said receiver;

determining at least one of a plurality of attenuation characteristics of said transmission medium from said driver to said receiver, dynamically providing, at the driver, a pre-emphasis coefficient to each of said digital signal pulses as said digital signal pulses are being transmitted through said transmission medium from said driver to said receiver, said pre-emphasis coefficient selected on the basis of at least one of said plurality of determined attenuation characteristics.

2. The method of claim 1, wherein said step of determining at least one of said plurality of pre-emphasis coefficients further comprises:

measuring the length of said transmission medium across which said series of said digital signal pulses are transmitted.

3. The method of claim 1, wherein said step of determining at least one of said plurality of pre-emphasis coefficients further comprises determining said attenuation characteristic of said network selected from the group consisting of transition frequency of said digital signal pulses, gauge of a cable, temperature of said network, humidity of said network.

4. The method of claim 2, wherein said step of dynamically providing a pre-emphasis coefficient to each of said digital signal pulses further comprises; selecting, based on said length of said transmission medium, one of a group a pre-emphasis coefficient registers within which a plurality of said pre-emphasis coefficients are stored.

5. The method of claim 4, wherein said step of dynamically providing a pre-emphasis coefficient to each of said digital signal pulses further comprises selecting one of said plurality of pre-emphasis coefficients stored within said selected register as determined by a history of at least three of said digital signal pulses.

6. The method of claim 1, wherein said step of dynamically providing said pre-emphasis coefficient further comprises:

transmitting a random signal packet of said digital signal pulses through said transmission medium connecting said driver and said receiver;

receiving said transmitted random signal packet either reflected back from or retransmitted from said receiver;

incrementing to, and selecting, one of a plurality of pre-emphasis coefficient registers and applying one of said plurality of pre-emphasis coefficients in said selected one of said plurality of pre-emphasis coefficient registers to said random signal packet until there are no errors in said received random signal packet.

7. The method of claim 6, wherein said step of dynamically providing a pre-emphasis coefficient to each bit of said random signal packet further comprises selecting one said plurality of pre-emphasis coefficients determined by a history of at least three of said bits of said signal packet.

8. The method of claim 1, wherein said step of dynamically provided said pre-emphasis coefficient further comprises:

transmitting a first test packet of known frequency through said transmission cable connecting said driver and said receiver;

receiving said transmitted first test packet either reflected back from or retransmitted from said receiver;

determining if said received first test packet has no errors;

setting said plurality of pre-emphasis coefficients in a pre-emphasis coefficient register to zero;

transmitting an n test packet of n frequency higher than said known frequency through said transmission cable;

receiving said transmitted n test packet either reflected back from or retransmitted from said receiver;

if said received n test packet has errors, incrementing said pre-emphasis coefficient register;

transmitting said n test packet again and incrementing said pre-emphasis coefficient register until said received n test packet has no errors;

transmitting a n+1 test packet of a n+1 frequency higher than said n frequency through said transmission cable;

receiving said transmitted n+1 test packet either reflected back or retransmitted from said receiver;

if said received n+1 test packet has errors, incrementing said pre-emphasis coefficient register;

transmitting said n+1 test packet again and incrementing said pre-emphasis coefficient register until said received n+1 test packet has no errors;

selecting said incremented pre-emphasis coefficient register when said n+1 and said n returned test packets have no errors.

9. The method of claim 8, wherein said step of dynamically providing a pre-emphasis coefficient to each bit of said digital signal pulses further comprises applying one of said plurality of pre-emphasis coefficients in said selected pre-emphasis coefficient register as determined by a history of at least three of said bits of said signal packet.

10. The method of claim 1, wherein said step of determining at least one of a plurality of attenuation characteristics further comprises:

transmitting a test pulse through said transmission medium from said driver to said receiver;

providing a first input threshold voltage to said receiver;

retransmitting said test pulse through said transmission medium from said driver to said receiver;

providing a second input threshold voltage to said receiver;

measuring a slope of a rise/fall edge of said test pulse between said first and said second input threshold voltages;

based on said measured slope, dynamically selecting one of a plurality of pre-emphasis coefficient registers in which said plurality of pre-emphasis coefficients are stored, thereby choosing a particular pre-emphasis coefficient; and applying said particular pre-emphasis coefficient in-situ to said series of digital signal pulses in said driver.

11. The method of claim 10, wherein said step of dynamically providing a pre-emphasis coefficient to each bit of said series of digital signal pulses further comprises selecting one of said plurality of pre-emphasis coefficients determined by a history of at least three of said bits of said signal packet.

12. An apparatus for digital signal transmission in a conductive network, comprising:
- means for transmitting a series of digital signal pulses from a driver to a receiver;
- means for measuring one of a plurality of attenuation characteristics of said transmitting means;
- means for selecting one of a plurality of pre-emphasis coefficient registers, each of said registers corresponding to a range of measurement values of one of said attenuation characteristics;
- means to select one of a plurality of pre-emphasis coefficients stored in said selected pre-emphasis coefficient registers based on the history of at least three bits of series of digital signal pulses; and
- means to dynamically apply, at the driver, said selected pre-emphasis coefficient to
- each bit of said series of digital signal pulses.

13. An apparatus for digital signal transmission in a conductive network, comprising:
- a driver from which to drive a series of digital signal pulses;
- a receiver to receive said series of digital signal pulses;
- a transmission medium connecting said driver and said receiver;
- a shift register to store at least three sequential bits of said series of digital signal pulses;
- a plurality of pre-emphasis coefficient registers connected to said shift register and to said driver, each of said registers having a plurality of pre-emphasis coefficients, one of said pre-emphasis coefficients to be applied to a particular bit of said digital signal pulses as determined by a history of at least three sequential bits stored in said shift register as said digital signal pulses are transmitted onto said transmission medium;
- a selector connected to said receiver and said pre-emphasis coefficient registers, said selector enabled to select one of said pre-emphasis coefficient registers as determined by attenuation characteristics of said transmission medium.

* * * * *